United States Patent [19]

Carlton et al.

[11] Patent Number: 4,718,669
[45] Date of Patent: Jan. 12, 1988

[54] ELECTRICALLY OPERATED LINE MONITOR FOR TENNIS

[76] Inventors: William C. Carlton, Tas-Silg, Tas-Silg, M'Xlokk; Margaret P. England, Villa Aventura, San Gwann, both of Malta

[21] Appl. No.: 403,962

[22] Filed: Aug. 2, 1982

Related U.S. Application Data

[63] Continuation-in-part of Ser. No. 463,695, Jun. 14, 1982, abandoned, which is a continuation of Ser. No. 92,904, Nov. 9, 1979.

[30] Foreign Application Priority Data

Nov. 10, 1978 [GB] United Kingdom ................. 7844026
Dec. 29, 1978 [GB] United Kingdom ................. 7850208

[51] Int. Cl.$^4$ .............................................. A63B 61/00
[52] U.S. Cl. .................................................. 273/29 R
[58] Field of Search .............. 273/29 R, 31; 340/165, 340/155, 156, 157

[56] References Cited

U.S. PATENT DOCUMENTS

| | | | |
|---|---|---|---|
| 3,370,284 | 2/1968 | Bango | 340/555 |
| 3,415,517 | 12/1968 | Kirst | 273/29 R |
| 3,810,148 | 5/1974 | Karsten | 273/29 R |
| 3,854,719 | 12/1974 | Supran | 273/29 R |
| 4,004,805 | 1/1977 | Chen | 273/29 R |
| 4,375,289 | 5/1983 | Schmall et al. | 273/29 R |

FOREIGN PATENT DOCUMENTS 1370332 10/1974 United Kingdom ............. 273/29 R

OTHER PUBLICATIONS

Electronic Design, Apr. 26, 1976, p. 20.

Primary Examiner—Richard C. Pinkham
Assistant Examiner—T. Brown
Attorney, Agent, or Firm—Griffin, Branigan & Butler

[57] ABSTRACT

An electrically operated line monitor for tennis which uses one or more rays substantially smaller in effective cross-section than a tennis ball to monitor areas of a tennis court adjacent critical lines thereof. The rays pass over the playing surface of the court at a height lower than the height of a tennis ball. In various embodiments, a first ray which actuates a 'good' signal on essentially complete interruption of its effective part travels over an area of the court in which a ball would strike if it were "good". The first ray travels essentially parallel to and in practice slightly distanced from a perpendicular from said critical line and is so positioned that a ball in play falling across the said 'good' area towards the said critical line and which just completely interrupts the reception of the effective part of the said first ray must afterwards strike the said critical line. The said first ray is the nearest 'good' ray to the perpendicular from the said critical line.

Further embodiments employ additional rays (referred to as further rays) and positioned slightly on either the inside or the outside of a perpendicular to the critical line depending on whether "good" or "fault" balls are to be monitored. The further rays are spaced progressively further from the perpendicular so that a ball in play striking the ground in a monitored area will interrupt the passage of at least one of the rays, thereby actuating a signal. In one of these embodiments, the first ray functions as a master ray to monitor the area just inside the perpendicular from the critical line. If the master ray is interrupted by the passage of a good ball which subsequently skids into the fault area, the master ray prevents any subsequent signal.

28 Claims, 8 Drawing Figures

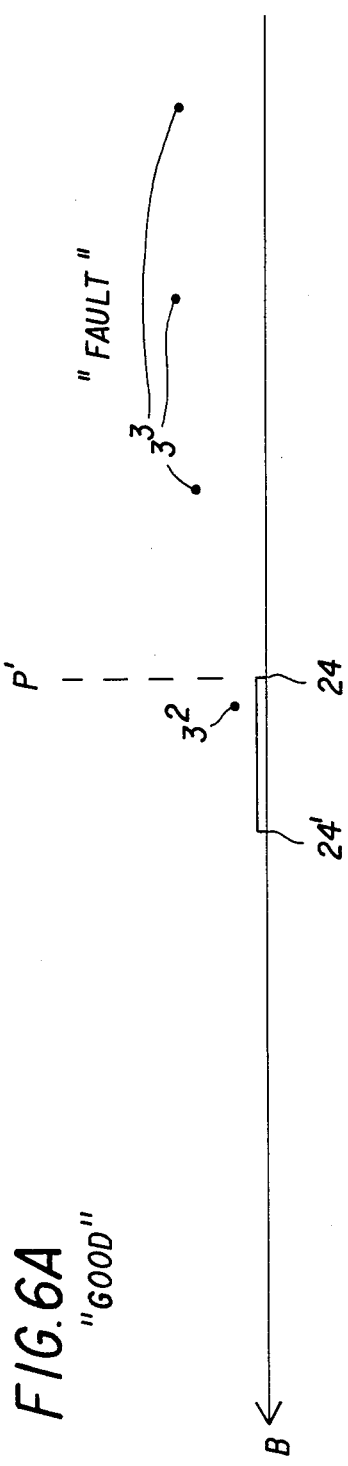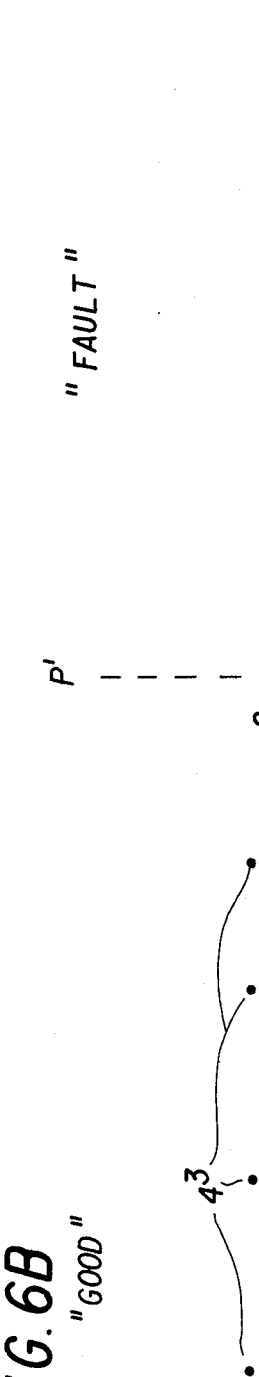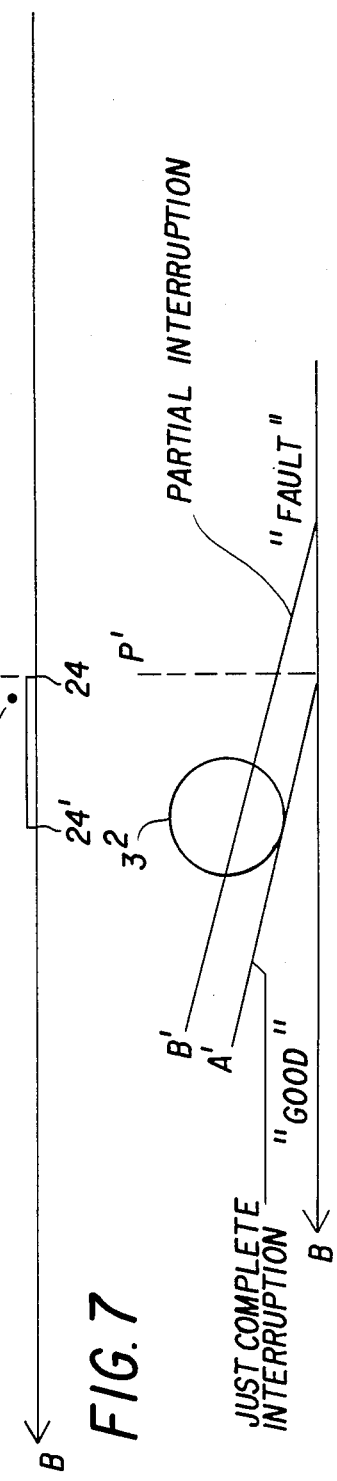

ELECTRICALLY OPERATED LINE MONITOR FOR TENNIS

This application is a continuation-in-part of U.S. patent application Ser. No. 06/463,695, filed June 14, 1982, which is a continuation application of U.S. patent application Ser. No. 092,904, filed Nov. 9, 1979.

This invention relates to an electrically operated line monitor for tennis which incorporates at least one transmitter in a first position. The transmitter projects at least one ray to at least one receiver in a second position for registering the ray The monitor also comprises a signalling means.

It is a feature of the game of tennis that is should be known whether the ball strikes the ground inside or outside certain parts of the court; these certain parts are limited by lines, the outside edges of which are the most important and are hereinafter called critical lines. In important games, linesmen are positioned so that they can assess where the ball strikes the ground. This duty requires a high degree of concentration on the part of the linesmen whose decisions are frequently questioned, sometimes with consequent upset to the orderly progress of the game; the latter is particularly the case when the ball falls near a critical line.

An electrically operated device for determining the position of the bounce of a ball in tennis and other games is known from British Specifications Nos. 1,370,331-2-3. This device incorporates a ball having an electrically conducting surface, which, on striking a surface on a court adapted to convey an electric current, causes a signal to indicate the position of the bounce of the ball. The device also incorporates a single ray to detect if a player's foot crosses a line (British Specification No. 1,370,332).

Rays for use in safety devices on machines and for burglar alarms and for many other uses in detection devices are well known. It is also well known to limit a ray by modulation and shutters and optical means so that an effective part of a ray will register on a specific receiver. Typical object-detecting devices are described in British Specifications Nos. 1,425,896 and 989,041.

The ball with its electrically conducting surface and the court with its special surface proposed in British Specifications Nos. 1,370,131-2-3 constitute requirements which could affect the game of tennis as it now stands. The ray proposed in British Specification No. 1,370,332 for detecting whether a player's foot crosses the base line, indicates that the use of rays was considered in connection with tennis, but a ray such as that proposed would need to reach higher than the height of a tennis ball in contact with the ground and moreover, a single ray sited as described in British Specification No. 1,370,332 would, even if its operative part were such as to be interrupted by a tennis ball, give the same signal for a ball which had bounced 'in' as for a ball which was about to bounce 'out'.

Therefore, it is an object of the present invention to provide a device which will correctly assess, within very close limits, whether the ball strikes the ground inside or outside the correct area of the court when the strike is near a critical line.

Advantages of the invention include the fact that no special ball or electrically conducting surface is required, and that the device can be used on any first class court and moved from one tournament to another. Additionally, by siting rays in a novel manner, proven techniques can be used to achieve a result more consistently reliable than hitherto.

SUMMARY

An electronically operated line monitor for tennis which uses one or more rays substantially smaller in effective cross-section than a tennis ball to monitor areas of a tennis court adjacent critical lines thereof. The rays pass over the playing surface of the court at a height lower than the height of a tennis ball. In various embodiments, a first ray which actuates a 'good' signal on substantially complete interruption of its effective part, travels over an area of the court in which a ball would strike if it were 'good'. The first ray travels essentially parallel to and in practice slightly distanced from a perpendicular from said critical line and is so positioned that a ball in play falling across the said 'good' area towards the said critical line and which just completely interrupts the reception of the effective part of the said first ray must afterwards strike the said critical line. The said first ray is the nearest 'good' ray to the perpendicular from the said critical line.

Further embodiments employ additional rays (referred to as further rays) and positioned slightly on either the inside or the outside of a perpendicular to the critical line depending on whether 'good' or 'fault' balls are to be monitored. The further rays are spaced progressively further from the perpendicular so that a ball in play striking the ground in a monitored area will interrupt the passage of at least one of the rays, thereby actuating a signal. In one of these embodiments, the first ray functions as a master ray to monitor the area just inside the perpendicular from the critical line. If the master ray is interrupted by the passage of a good ball which subsequently skids into the fault area, the master ray prevents any subsequent signal.

One embodiment of the invention employs a plurality of further rays, each ray having the effective cross-section as described above and each successive ray being distanced progressively farther from the critical line and at substantially the same height above the playing surface of the court. The distance between any of the further rays is such that a ball striking the ground in the area monitored by the device will interrupt one of the rays, thereby actuating the signal. The cross section of a ray may conveniently be limited by passing the ray through one or more small apertures but alternative methods of obtaining a similar result may be used. To reduce the possibility of interference the axes of rays travelling in the same direction are spaced no less than the diameter of a tennis ball apart at their receivers and preferably adjacent rays travel in opposite directions.

In another embodiment of the invention a transmitter in a first position projects a diverging ray which registers on a plurality of receivers in a second position, the arrangement being such that the said diverging ray is split into a plurality of further rays each having substantially the same characteristics as the rays already mentioned.

According to still another embodiment of the invention, a transmitter in the second position also projects a diverging ray which registers on a plurality of receivers in the first position. This diverging ray is also split into a plurality of further rays, each ray having substantially the same characteristics as the rays already mentioned. This combination of two transmitters projecting diverging rays from opposite sides of the court allows a rectangular area of the court, just outside the critical line, to be monitored.

In another embodiment of the invention, in addition to the effective cross-section of the ray being limited at the receiver, it is also limited at the transmitter, so that the ray can be directed to register on a specific receiver. This is done either by directing the scan of a ray away from all but one receiver, by modulation, or by apertures. Other methods may be employed. This feature of the invention is useful if an independent master ray (hereinafter described) is incorporated.

It is also useful if the invention is developed so that there are two or more transmitters in a first position aligned with the same number of receivers in a second position, the arrangement being such that the rays connecting the transmitters and receivers are substantially parallel to each other. Alternatively there are, in the first position, at least one transmitter and at least one receiver, and in a second position, at least one receiver and at least one transmitter, the transmitters and receivers being aligned so that the rays associated with them are substantially parallel to each other.

The embodiments summarized above are suitable for monitoring an area of a court on either one side or the other of the perpendicular to the critical line, depending on whether 'good' or 'fault' balls are to be monitored. If a ray is sited within the critical line, i.e. over the area in which the ball must bounce if it is a 'good' ball, the signal given is preferably silent. If a ray is sited outside the critical line, i.e. over the area in which the ball would bounce if it were a 'fault', the signal given is preferably audible although a silent signal such as a light may also be used. The effect is to monitor the area of the court adjacent to the ray because the ball will interrupt the reception of the ray by the receiver either on approaching the ground to bounce or on leaving the ground after bouncing.

It can occasionally happen that a 'good' ball can skid along the ground until it interrupts a further ray outside a critical line and thus give a false alarm. To cater for this eventuality, a further embodiment incorporates a preventing device conected with said first ray which is then referred to as the master ray, which is provided in similar position to said first ray. The master ray is similar to the rays already described but it is an independent ray so that if it is interrupted by the passage of a ball, instead of actuating an alarm, it immediately prevents any alarm which would have been caused by the ball skidding through and interrupting any of the further rays which would normally actuate the 'fault' alarm. This effect is achieved, preferably, by electrically preventing any signal from the 'fault' rays from reaching the 'fault' alarm.

BRIEF DESCRIPTION OF THE DRAWINGS

In order that the invention may be understood and readily carried into effect, the following description is made with reference to the accompanying drawings in which:

FIGS. 6A and 6B are diagrammatic views showing the cross-section of two alternate embodiments of ray arrangements.

FIG. 7 is an enlarged view of the area around the ray $3^2$ in FIG. 6A.

DETAILED DESCRIPTION OF THE DRAWINGS

Figure 1:
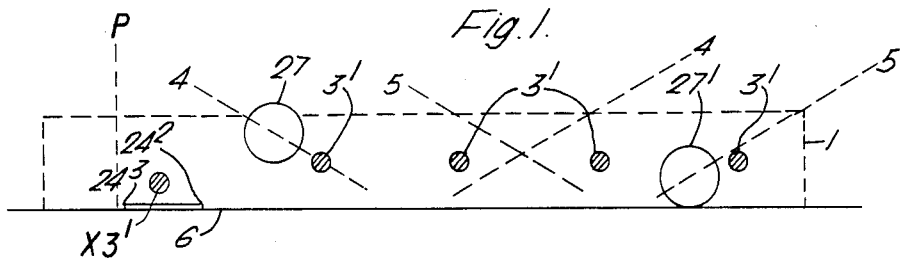
FIG. 1 is a diagrammatic view showing a cross-section of a typical arrangement of rays in relation to the surface of the court and the bounce of the ball.
Figure 3:
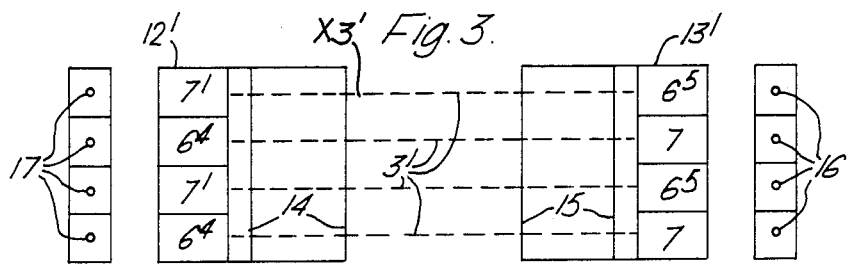
FIG. 3 is a diagrammatic front elevation with the associated plan view of the form of the invention shown in FIG. 1 on a smaller scale.
Figure 4:
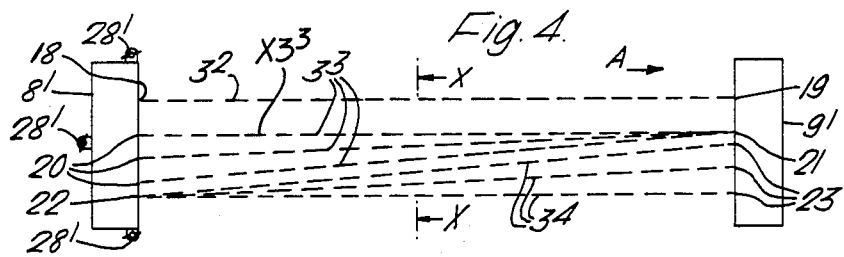
FIG. 4 is a diagrammatic plan view of the arrangement of the rays according to one embodiment of the invention.
Figure 5:
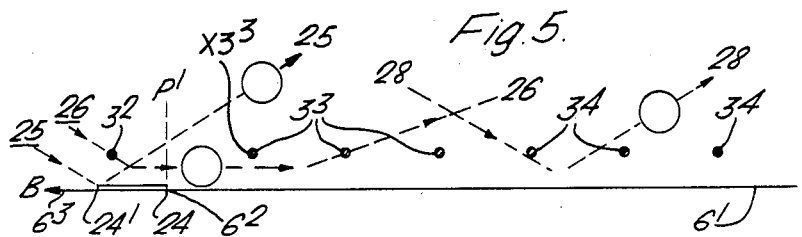
FIG. 5 is a diagrammatic view of the form of the invention shown in FIG. 4 showing on a larger scale a cross-section through the rays in relation to the surface of the court and a critical line.

In FIGS. 1 and 3 the prefix X identifies the ray nearest a perpendicular from a critical line. In FIGS. 4 and 5 the prefix X identifies thh ray other than the master ray which is nearest a perpendicular from a critical line.

Referring now to FIG. 1, the outline of a typical box 1 housing one form of the invention is shown in relation to the cross-section of four infra red further rays $3^1$, a first ray $X3^1$, and a service line $24^2$–$24^3$ the outside edge $24^3$ being a critical line. The axes of the further rays are about 4.5 centimeters and that of the first ray $X3^1$ is about 2 centimeters above the playing surface of the court and the highest effective part of the rays is less than the height of a typical tennis ball $27^1$ when it is making contact with the ground. The nearest of the rays $3^1$ to the perpencidular P from the critical line $24^3$ is about 15 centimeters from the perpendicular P and inside it, the first ray $X3^1$ is 5 centimeters from the perpendicular P, that is, the rays are over that part of the court in which the ball would bounce if it were 'good'. The dotted lines 4 and 5 represent the path of the centre of balls 27 and $27^1$ striking the ground within the area monitored by the rays $3^1$. The ball 27 passes through a ray $3^1$ after striking the ground whilst the ball $27^1$ on path 5 passes through a ray as it approaches the ground. The cross-section of any of the rays is substantially smaller in any dimension than the diameter of typical tennis balls 27 and $27^1$. A ball $27^1$ passing across a ray interrupts the reception of the ray by its receiver even though the path 5 does not pass through the axis of a ray. The distance between the axes of any rays having their receivers in the same position is, at their receivers, greater than the diameter of a tennis ball and, in this instance, is illustrated as about 15 centimeters. When the passage of a ray is completely interrupted by a ball, the device gives a signal. This device would monitor an area of the court in which a ball would strike if it were 'good'.

Figure 2:
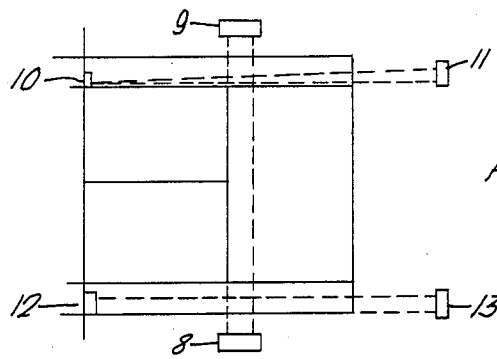
FIG. 2 is a diagrammatic view of one side of a tennis court showing some typical positions for various forms of the device.

Referring now to FIG. 2, this shows three forms of the invention in position to monitor various critical lines on a tennis court. Boxes 8 and 9 contain transmitters and receivers arranged in the currently preferred form of the invention. This device monitors, in this instance, the service line; further explanation will be given with reference to FIG. 5.

Boxes 12 and 13 contain transmitters and receivers which provide several parallel rays which, in this instance, monitor an area just inside a critical line of the doubles court. In this case, a signal would indicate that the ball was 'good'.

Referring now to FIG. 3, a box $12^1$ houses two transmitters $7^1$ and two receivers $6^4$; a box $13^1$ houses two receivers $6^5$ and two transmitters 7. Incorporated in box $12^1$ are two screens 14 spaced about 30 centimeters apart and in box $13^1$ are two screens 15 also about 30 centimeters apart. In the screens an aligned with their respective transmitters and receivers are small apertures 17 in box $12^1$ and similar apertures 16 in box $13^1$; the apertures are about 1.5 centimeters in diameter. These apertures limit the spread of the rays $3^1$ at the transmitters adn the cross-section of the rays $3^1$ at the receivers. This device corresponds with that shown at 12 and 13 on FIG. 2.

Referring now to FIG. 4, box $8^1$ houses a transmitter 18 which limits the ray $3^2$ which it projects so that it registers only on receiver 19 in box $9^1$. Box $8^1$ also houses three receivers 20 on which a diverging ray $3^3$ from transmitter 21 in box $9^1$ registers. Box $8^1$ also houses a transmitter 22 which projects a diverging ray $3^4$ which registers on the three receivers 23 housed in box $9^1$. The rays $3^3$ and $3^4$ are infra red rays which are coupled so that if the reception of any of them is interrupted, a signal is given. This signal will preferably be an alarm if the device is sited in relation to a critical line as will be indicated in the description for FIG. 5 and the ray $3^2$ has not been interrupted. The ray $3^2$ is a master ray and is independent of the rays $3^3$ and $3^4$ except that, if the reception of the master ray $3^2$ is substantially completely interrupted it immediately gives a signal which prevents any signal given by the rays $3^3$ and $3^4$ caused by the passed of the same ball. This may be done, for instance, by electrically stopping the supply to the alarm normally actuated by the interruption of any of the rays $3^3$ and $3^4$. Adjusting screws $28^1$ may be provided.

Referring now to FIG. 5, the playing surface of a court $6^1$-$6^2$-$6^3$ is shown in relation to a cross-section XX of the rays $3^2$, $3^3$, shown in plan in FIG. 5 and a typical service line 24–$24^1$ the edge 24 of which is a critical line. The net is in the direction of the arrow B. The axes of the rays $3^3$ and $3^4$ are about 4.5 centimeters above the surface of the court, the axis of ray $3^2$ is about 2 centimeters above the surface of the court, and the highest part of any ray above the surface of the court is less than the height of a tennis ball making contact with the ground. The device is sited so that the first ray $3^2$ runs parallel to and adjacent to and slightly distanced in (about 8 centimeters) from the perpendicular $P^1$ from the critical line 24. The nearest of the further rays $3^3$ to the critical line 24 likewise runs parallel to and adjacent to the perpendicular $P^1$ from the critical line 24 but is about 15 centimeters outside the perpendicular $P^1$, that is, on the opposite side of the perpendicular $P^1$ to the master ray $3^2$. The other further rays $3^3$ and $3^4$ are spaced progressively from the perpendicular $P^1$. If a ball and its path 25 from a service strikes the ground between $6^3$ and $6^2$ and then interrupts the ray $3^2$, a light confirms that it is a 'good' ball. If a ball and its path 28 from a service strikes the ground between $6^2$ and $6^1$ it will interrupt at least one of the rays $3^3$ or $3^4$ thus actuating an alarm. If a ball and its path 26 from a service substantially completely interrupts the ray $3^2$ and then strikes the ground between $6^3$ and $6^2$ or strikes the critical line 24 and subsequently skids into the area $6^2$-$6^1$ interrupting any of the rays $3^3$ or $3^4$ the prior interruption of the ray $3^2$ electrically prevents any supply from actuating any alarm and a light confirms that the ball was 'good'.

The rays currently used are infra red or gallium arsenide based but any other rays which achieve similar results may be used. The reaction of a receiver to the interruption of its ray must be very fast and it is an advantage if a delay is incorporated so that although the signal is instantly actuated by the interruption of a ray, the signal itself is prolonged after the interruption of the ray has ceased. The transmitters are conveniently housed in weatherproof boxes which are designed and sited so that the axes of the further rays will preferably cross the playing surface of the court at a height of about 4.5 centimeters, the first or master ray is preferably lower. It is currently preferred that the greatest dimension of the effective cross-section of a typical ray be less than 2.5 centimeters. In the embodiments of FIGS. 1, 5 and 6A, for example, the axis of the nearest of the 'fault' or further rays to the perpendicular from the critical line being monitored is preferably sited about 15 centimeters outside the perpendicular. The further 'fault' rays are distanced progressively further from the critical line. The distance between the axes of any rays transmitted in the same direction and parallel to each other should not be less than the diameter of a tennis ball. If the rays diverge from the transmitter, the distance between the axes of neighboring rays at the receiver end should not be less than the diameter of a tennis ball. A distance of 15 centimeters separation has proven satisfactory in some embodiments. It is currently preferred that the axis of the master ray should be between 5 and 10 centimeters inside the perpendicular from the critical line being monitored. The authority governing the game will almost certainly lay down the position in the light of experience and the perfection or otherwise of the court being used.

FIGS. 6A and 6B illustrate two embodiments of the invention with their respective rays shown in positional relationship. In both FIGS. 6A and 6B $P^1$ represents the perpendicular from the critical line 24 and the arrow B indicates the direction of the net. Accordingly, the area of the court to the left of the perpendicular $P^1$ is the area of the court in which a 'good' ball would strike as it first approaches the court to bounce, while the area of the court to the right of the perpendicular is the area of the court in which a 'fault' ball would strike.

The embodiment of FIG. 6A is substantially the same as the embodiment of FIG. 5 discussed above. Ray $3^2$ and further rays $3^3$ of the FIG. 6A embodiment are positioned substantially identically as in FIG. 5. Ray $3^2$ of FIG. 6A, which functions as the master ray described above, is also known as "the first ray" for purposes of equating the position of ray $3^2$ with a ray $4^2$ of the embodiment of FIG. 6B.

As in the embodiment of FIG. 5, ray $3^2$ must be substantially completely interrupted in order for interruption thereof to prevent any subsequent signal occasioned by the interruption (be it partial or complete) of any of the rays $3^3$.

The embodiment of FIG. 6B includes a first ray $4^2$ and a plurality of further rays $4^3$. The first ray $4^2$ is positioned substantially identically to the first ray $3^2$ of FIG. 6A: ray $4^2$ runs substantially parallel to the critical line 24 and is over an area of the court which a ball in play would strike if it were a 'good' ball; the ray $4^2$ is in practice slightly distanced from the perpendicular $P^1$ from the critical line 24 and is so positioned that a ball falling from over the 'good' area towards the critical line must, if it just completely interrupts the said ray $4^2$, strike the critical line 24. The line A' in FIG. 7 shows just complete interruption in respect of the ray $3^2$ for a ball falling from over the 'good' area.

The further rays $4^3$ of FIG. 6B travel over the 'good' area of the court at distances progressively farther from said critical line and are distanced apart from one another so that a ball in play striking the ground in the area monitored interrupts one of the further rays. Interruption (either partial or complete) of one of the further rays $4^3$ causes the generation of a signal indicative of the fact that the ball is 'good'. In this regard, if any rays are transmitted in the same direction and are parallel to each other the distance between these rays at their receivers should not be less than the diameter of a tennis ball. If the further rays $4^3$ were to be diverging rays (although not illustrated as such in FIG. 6B but easily understood in conjunction with FIG. 4), the distance between the axes of neighboring rays at the receiver end should not be less than the diameter of a tennis ball. Unlike ray $3^2$ of FIG. 6A, however, ray $4^2$ of FIG. 6B does not function as a master ray. In this respect, substantially complete interruption of ray $4^2$ indicates that the ball is 'good' and generates a signal accordingly.

It is to be noted that in none of the foregoing embodiments is an area of a tennis court adjacent a critical line monitored by an effective ball monitoring ray that passes directly over the critical line. In this regard, in each embodiment the nearest effective ball monitoring ray to the critical line is distanced from the perpendicular from the critical line. In FIG. 1, for example, the nearest effective ball monitoring ray to the perpendicular P to the critical line $24^2$ is the ray $X3^1$. In FIG. 6A the nearest effective ball monitoring ray to the perpendicular $P^1$ to the critical line 24 is the first ray $3^2$, which functions as a master ray. In FIG. 6B the nearest effective ball monitoring ray to the perpendicular $P^1$ to the critical line 24 is the first ray $4^2$, which does not function as a master ray. The term "effective ball monitoring ray" as used herein denotes a ray which is used to determine whether a ball is a 'good' ball or a 'fault' ball. According to the embodiments of the invention a first ray or master ray is not positioned directly over a critical line because it is not possible to make an absolutely flat court. The final decision on this joint rests with the authority governing the game who may decide that the said first ray or master ray is the critical line.

The figures just given are currently considered suitable for monitoring the service line for which the device is primarily intended; if it were desired to monitor an area in which the ball was likely to fall more perpendicularly, the rays would be closer together. A device not required as the game progresses is suspended, for instance, by cutting off the supply to the audible 'fault' alarm after a 'good' service. The boxes housing the transmitters and receivers may be made adjustable to assist alignment of the rays. Reflectors may be incorporated to change the direction of the rays so that, for instance, the rays are projected from and received on the same side of the court. The siting of the rays, particularly the 'fault' ray nearest to its critical line and an associated master ray, is very important. If the 'fault' ray nearest to a critical line is too far from the perpendicular from that critical line, a ball could strike the ground outside the critical line and then bounce over the nearest 'fault' ray, thus giving no alarm. If the master ray is too far in from the perpendicular from its critical line, a ball could pass over the master ray without interrupting it, then strike the critical line and, after bouncing, interrupt a 'fault' ray and thus actuate an alarm without cause.

Referring now to FIG. 7, this is an enlarged view of the area around the ray $3^2$ in FIG. 6A, to show the definite dividing line caused by complete interruption. If the ball falls lower than the line $A^1$ the ball must be 'good'. If the ball falls with the bottom of the ball just completely interrupting the ray $3^2$ along the line $A^1$ the ball just strikes the critical line and a 'good' signal is given. If ray $3^2$ is a master ray, any further signals are prevented. With partial interruption, for instance, the bottom of the ball falling along the line $B^1$ the ball is a 'fault'. Ray $3^2$ gives no signal and the further or 'fault' rays give a 'fault' signal. The ray $3^2$ is not directly on the critical line because in practice the court is never exactly flat.

We claim:

1. An electrically operated device to monitor the area near a critical line on a tennis court, said device including at least one transmitting means comprising a first transmitter in a first position, at least a first receiver in a second position, a further transmitter, a further receiver, and at least one signalling means controlled by the said first receiver, the said first transmitter projecting a first ray, the effective part of which registers on the said first receiver, the said first ray running substantially parallel to the said critical line and running over an area of the court on which a standard tennis ball in play would strike if it were a "good" ball, the said first receiver comprising means for defining the effective part of the said first ray, said effective part of said first ray being the part of said first ray which registers on said first receiver, the cross section of the effective part of the said first ray throughout its useful length being limited so that the said cross section is substantially smaller in any dimension than the diameter of a standard tennis ball, and so that the highest effective part of the said first ray above the playing surface of the court is less than the height of a standard tennis ball in play making contact with the ground, the said further transmitter projecting a further ray which registers on said further receiver and which is the closest ball monitoring ray to said first ray, said device being characterised in that:

(1) the said signalling means generates a "good" signal only on the complete interruption of the effective part of the said first ray registering on the said receiver;

(2) the said first ray is so positioned that a standard tennis ball in play falling across the said area of the court in which it would strike if it were a "good" ball and falling towards the said critical line and which just completely interrupts the said effective part of the said first ray, must afterwards strike the said critical line; and, (3) the receiver of said further ray is spaced apart from the said receiver of the said first ray by a distance greater than the diameter of a standard tennis ball.

2. The apparatus of claim 1 further comprising:
    transmitting means for transmitting at least one further ray, said further ray being over an area of the court on which a standard tennis ball in play would strike if it were a fault and substantially parallel to said critical line and being the nearest further ray over said "fault" area to said first ray and the distance between the axes of said first ray and said further ray being not more than such that a standard tennis ball in play striking the ground in the area monitored by the device must completely interrupt the reception of said first ray or said further ray, the cross section of the effective part of said further ray throughout its useful length being substantially smaller in any dimension than the diameter of a standard tennis ball, the highest effective part of said further ray above said tennis court being less than the height of a standard tennis ball making contact with said tennis court;

means for receiving said further ray; and, means connected to said means for receiving said further ray for generating a signal when a standard tennis ball interrupts the reception of said further ray at said receiving means, and wherein said first ray is an independent ray known as a master ray which is connected to a separate signalling means for generating a separate signal when a standard tennis ball completely interrupts the reception of the effective part of said master ray at its receiving means, said separate signal generated by said interception of said master ray preventing any signal caused by the interruption of any said further ray.

3. The apparatus of claim 2 wherein one of said further rays travels substantially parallel to said critical line and is the nearest such further ray to said critical line, wherein the remainder of said further rays travel over said court at distances progressively farther from said critical line and are distanced apart from one another so that a ball in play striking the ground in the area monitored by the device interrupts one of said further rays, the distance between the axes of any rays having their receivers in the same position being not less than the diameter of a standard tennis ball.

4. The apparatus of claim 3 wherein said transmitting means for transmitting said further ray is in one of said first and second opposing positions for projecting a first diverging ray which registers on a plurality of receivers in the opposite position, each of said receivers having limiting means such taht said first diverging ray is split by its receivers into said plurlarity of said further rays.

5. The apparatus of claim 4 further comprising transmitting means in a position opposite the position of the means transmitting said first diverging ray for projecting a second diverging ray which registers on a plurality of further receivers in said position of said means transmitting said first diverging ray, each of said second diverging ray receivers having limiting means such that said second diverging ray is split by said second diverging ray receivers into a plurality of further rays, said further rays comprising said second diverging ray and being projected in a direction opposite to the direction of the further rays comprising said first diverging ray.

6. The apparatus of claim 1 further comprising transmitting means for transmitting a plurality of further rays, said further rays being distanced from a perpendicular from said critical line and over an area of the court on which a standard tennis ball in play must strike if it is a "good" ball, a cross section of the effective part of said further rays throughout their useful length being substantially smaller in any dimension than the diameter of a standard tennis ball, the highest effective part of said further rays above said tennis court being less than the height of a standard tennis ball making contact with said tennis court; wherein means are provided for receiving said further rays; wherein means connected to said means for receiving said further rays are provided to generate a signal when a standard tennis ball completely interrupts the reception of the effective part of at least one of said further rays at said receiving means; wherein said further rays are distanced apart from one another so that a standard tennis ball in play striking the ground in the area monitored by the device interrupts one of said rays and thereby generates a "good" signal; and, wherein the receiver of any ray which is in same position as the receiver of any other ray is spaced apart from the receiver of any any other ray by not less than the diameter of a standard tennis ball.

7. The apparatus of claims 3 or 6 wherein said further rays are substantially parallel to each other and wherein at least one of said further rays is projected in a direction opposite at least one other said further ray.

8. The apparatus of claim 6 wherein said transmitting means for transmitting said further ray is in one of said first and second opposing positions and projects a first diverging ray which registers on a plurality of receivers in the opposite position, each of said receivers having limiting means such that said first diverging ray is split by its receivers into said plurality of said further rays, the nearest of said further rays to said critical line being parallel to and distanced from said critical line.

9. The apparatus of claim 8 further comprising transmitting means in a position opposite the position of the means transmitting said first diverging ray for projecting a second diverging ray which registers on a plurality of further receivers in said position of said means transmitting said first diverging ray, each of said second diverging ray receivers having limiting means such that said second diverging ray is split by said second diverging ray receivers into a plurality of further rays, said further rays comprising said second diverging ray and being projected in a direction opposite to the direction of the further rays comprising said first diverging ray.

10. The apparatus of claims, 1, 2, or 6, wherein said ray and said further rays are infrared rays.

11. The apparatus of claim 1 further comprising:

transmitting means for transmitting at least one further ray, said further ray being distanced from said perpendicular from said critical line and over an area of the court on which a standard tennis ball in play would strike if it were a fault, a cross section of the effective part of said further ray throughout its useful length being substantially smaller in any dimension than the diameter of a standard tennis ball, the highest effective part of said further ray above said tennis court being less than the height of a standard tennis ball making contact with said tennis court;

means for receiving said further ray; and, means connected to said means of receiving said further ray for generating a signal when a standard tennis ball interrupts the reception of the effective part of said further ray at said receiving means; and wherein said first ray is an independent ray known as a master ray which is connected to a separate signalling means for generating a separate signal when a standard tennis ball completely interrupts the reception of the effective part of said master ray at its receiving means, said separate signal generated by said interception of said master ray serving to prevent any signal caused by the interruption of any said further ray.

12. The device of claim 1, further comprising a first box which houses said first ray transmitter, said first ray also being known as a master ray, and said first ray transmitter also being known as a master ray transmitter, said master ray transmitter being adapted to project a master ray and a second further ray transmitter adapted to project a second further ray, the device also comprising a second box which matches with the said first box, the said second box housing a master ray receiver with limiting means adapted to receive the said master ray and at least one second further ray receiver with limiting means adapted to receive said second further ray projected by said second further ray transmitter in said first box, and in which the said second box also houses a first further ray transmitter adapted to project a first further ray in the opposite direction to the said master ray and the said second further ray and the said first further ray transmitter being sited between the said master ray receiver and the said second further ray receiver and the said first box also houses at least one first further ray receiver adapted to receive said further ray and sited between said master ray transmitter and the said second further ray transmitter, the said master ray receiver controlling said signalling means and said further ray receivers controlling separate signalling means which can generate a signal if the reception of a ray by any further ray receiver is completely interrupted, and wherein said signalling means controlled by said master ray receiver will, if the reception of the effective part of the said master ray by the said master ray receiver is completely interrupted, prevent any signal which would normally be caused by the interruption of the reception of any further ray by any further ray receiver.

13. The device of claims 1, 2, and 6 wherein said rays are gallium arsenide based rays.

14. An electrically operated device for monitoring an area near a critical line on a tennis court, said device comprising:

first transmitting means situated substantially in a first position, said first transmitting means comprising at least one transmitter for projecting at least one tennis ball monitoring first ray to a second position, said first ray being over a "good" area of the court and running essentially parallel to and in practice slightly distanced from a perpendicular from said critical line as said first ray travels from said first position to said second position, said first ray being the nearest effective "good" ball monitoring ray to said perpendicular from said critical line, said first ray being so positioned that a standard tennis ball in play falling across the said "good" area towards the said critical line and which just completely interrupts the reception of the effective part of the said first ray must afterwards strike the said critical line;

first receiving means situated substantially in said second position, said first receiving means comprising at least one receiver for receiving the ray projected by said first transmitting means, said receiver comprising means for defining the effective part of the said first ray, the effective part of said first ray being the part of said ray which registers on said receiver, the cross section of the effective part of the said first ray throughout its useful length being limited so that the said cross section is substantially smaller in any dimension than the diameter of a standard tennis ball, and so that the highest effective part of the said first ray above the playing surface of the court is less than the height of a standard tennis ball in play making contact with the ground;

first signalling means connected to said first receiving means for generating a "good" signal when a standard tennis ball completely interrupts the reception of the effective part of said first ray at said first receiving means;

second transmitting means situated in a position for transmitting at least one further tennis ball monitoring ray which is the closest tennis ball monitoring ray to said first ray;

second receiving means situated in a position opposite said second transmitting means for receiving said at least one further tennis ball monitoring ray, said second receiving means comprising a receiver for said at least one further tennis ball monitoring rays, said further ray receiver being spaced apart from the receiver of said first ray by a distance greater than the diameter of a standard tennis ball; and, second signalling means connected to said second receiving means for providing an indication when a standard tennis ball completely interrupts the reception of the effective part of said further tennis ball monitoring ray at the further ray receiver.

15. The device of claim 14 wherein each further ray has an effective cross-section throughout its useful length smaller in any direction than the diameter of a standard tennis ball, each further ray having its highest effective part above said tennis court less than the height of a standard tennis ball making contact with a tennis court, and wherein any succeeding further rays are spaced progressively further from the perpendicular from said critical line, wherein the receivers of adjacent receiving means are not less than the diameter of a standard tennis ball apart and not more than such that a standard tennis ball striking the ground in the area monitored by the device will interrupt the reception of at least one of the rays, thereby actuating one of said signalling means.

16. The device of claim 15 wherein said plurality of further rays are substantially parallel to each other.

17. The device of claim 15 wherein said second transmitting means projects a diverging ray, said diverging ray being split into a plurality of rays by a plurality of receivers comprising said second receiving means, each ray of said plurality of rays split so as to have an effective cross-section throughout its useful length substantially smaller in any dimension than the diameter of a standard tennis ball.

18. The device of claim 17 further comprising:
third transmitting means situated in a position opposite said second transmitting means, said third transmitting means comprising at least one transmitter for projecting a second diverging ray substantially toward the position of said second transmitting means, the highest effective part of said diverging ray above said tennis court being less than the height of a standard tennis ball making contact with said tennis court;
third receiving means situated in a position opposite said third transmitting means, said third receiving means comprising a plurality of receivers for splitting said second diverging ray into a plurality of rays and for receiving said plurality of rays, each ray of said plurality of rays having an effective cross-section throughout its useful length smaller in any direction than the diameter of a standard tennis ball, said third receiving means being connected to said second signalling means to provide an indication that a tennis ball has interrupted the reception of any of said plurality of rays at said third receiving means.

19. The device as in claim 15 in which any said further ray is over an area of the court in which a standard tennis ball in play would strike if it were a "fault" and the said distance from the said perpendicular being such that a standard tennis ball in play which strikes the surface of the court just outside the critical line will afterwards interrupt the passage of a further ray.

20. A device as in claim 15 in which any said further ray is over an area of the court in which a ball in play must strike if it is a 'good' ball and the said distance from the said first ray being such that a ball in play will interrupt the passage of at least one ray in the area monitored by the device.

21. The device of claim 14 further comprising:

means for transmitting a master ray as the said first ray between said first position and said second position, said master ray running essentially parallel to and in practice slightly distanced from a perpendicular from said critical line as said master ray travels between said first position and said second position but on an opposite side of said perpendicular than any said further ray, the cross-section of the effective part of said master ray throughout its useful length being smaller in any direction than the diameter of a tennis ball, the highest effective part of said master ray above said tennis court being less than the height of a tennis ball making contact with said tennis court;

means for receiving said master ray; and, means connected to said means for receiving said master ray for preventing said signalling means when a tennis ball interrupts the reception of any said further ray, thereby preventing the generation of a subsequent signal.

22. The device of claim 14 wherein a receiver is adapted to limit the cross-section of the effective part of said ray throughout its useful length so that the ray cross-section is substantially smaller in any dimension than the diameter of a tennis ball.

23. The device of claim 14 wherein said rays are infra red rays.

24. The device of claim 14 wherein said rays are gallium arsenide based rays.

25. The device of claim 14 wherein a transmitter is adapted to limit the cross-section of the effective part of said ray throughout its useful length so that the ray cross-section is substantially smaller in any dimension than the diameter of a standard tennis ball.

26. The device of claim 14 wherein a transmitter is adapted to limit the cross-section of said ray so that said ray can be directed to register on a specific receiver.

27. A method of monitoring an area near a critical line on a tennis court, said method comprising the steps of:

projecting a first ray from a transmitting means in a first position to a receiver in a second position, said first ray receiver comprising means for defining the effective part of the said first ray, said effective part of said first ray being the part of said first ray which registers on said first ray receiver;

limiting the cross section of the effective part of said first ray throughout its useful length so that said cross section is substantially smaller in any dimension than the diameter of a standard tennis ball;

positioning said first ray whereby the highest effective part of said first ray above the playing surface of the court is less than the height of a standard tennis ball in play making contact with the court;

positioning said first ray whereby a standard tennis ball in play which falls across the said "good" area towards the critical line and which just completely interrupts the reception of the effective part of the said first ray must afterwards strike the said critical line; and, projecting a further ray from a transmitting means to a further ray receiver, said further ray being the closest ball monitoring ray to said first ray and being projected in a manner whereby the further ray receiver is spaced apart from the receiver of the said first ray by a distance greater than the diameter of a standard tennis ball.

28. A method of monitoring an area near a critical line on a tennis court, said method comprising the steps of:

projecting a first ray from a transmitting means in a first position to a first ray receiver in a second position, said first ray receiver comprising means for defining the effective part of the said first ray, said effective part of said first ray being the part of said first ray which registers on said first ray receiver;

limiting the cross section of the effective part of said first ray throughout its useful length so that said cross section is substantially smaller in any dimension than the diameter of a standard tennis ball;

positioning said first ray whereby said first ray runs substantially parallel to said critical line and over a "good" area of the court on which a standard tennis ball is in play would strike if it were a "good" ball;

positioning said first ray whereby the highest effective part of said first ray above the playing surface of the court is less than the height of a standard tennis ball in play making contact with the court;

slightly distancing said first ray in practice from a perpendicular from said critical line as said first ray travels from said first position to second position, said first ray being the nearest effective "good" ball monitoring ray to said perpendicular from said critical line; and, positioning said first ray whereby a standard tennis ball in play which falls across the said "good" area towards the critical line and which just completely interrupts the reception of the effective part of the said first ray must afterwards strike the said critical line; and, projecting a further ray from a transmitting means to a further ray receiver, said further ray being the closest ball monitoring ray to said first ray and being projected in a direction which is the opposite of a direction from said first position to said second position.

* * * * *